United States Patent [19]

Holmquist et al.

[11] Patent Number: 5,007,886
[45] Date of Patent: Apr. 16, 1991

[54] LIMITED SLIP DIFFERENTIAL

[75] Inventors: Ralph E. Holmquist, Battle Creek; David A. Janson, Plymouth, both of Mich.

[73] Assignee: Eaton Corporation, Cleveland, Ohio

[21] Appl. No.: 457,072

[22] Filed: Dec. 26, 1989

[51] Int. Cl.[5] .............................................. F16H 1/44
[52] U.S. Cl. ................................... 475/231; 475/230
[58] Field of Search ............... 475/150, 233, 232, 231, 475/230, 86, 84

[56] References Cited

U.S. PATENT DOCUMENTS

| Re. 28,004 | 5/1974 | Otteman | 74/711 |
| 3,732,752 | 5/1973 | Louckes et al. | 74/710.5 |
| 4,389,909 | 6/1983 | Gorcensk, Jr. | 475/232 |
| 4,526,063 | 7/1985 | Oster | 74/710.5 |
| 4,644,823 | 2/1987 | Mueller | 74/710.5 |
| 4,805,486 | 2/1989 | Hagiwara et al. | 475/150 |
| 4,838,118 | 6/1989 | Binkley | 475/231 |
| 4,876,921 | 10/1989 | Yasui et al. | 74/710.5 |

FOREIGN PATENT DOCUMENTS 0264579  4/1988  European Pat. Off. .............. 475/86

Primary Examiner—Allan D. Herrmann
Assistant Examiner—Ryan Massey
Attorney, Agent, or Firm—L. J. Kasper

[57] ABSTRACT

An improved differential gear mechanism is disclosed of the type including a clutch pack (35) operable to limit differentiating action of a pair of side gears (23,25) relative to a differential case (11). The clutch pack (35) is engaged by a cam means (41) including a pair of cam members (23,43) having engaging cam surfaces (45,47). Initiation of engagement of the clutch pack (35) may occur in response to an external signal (83) by means of a pair of actuation members (53) which engage one of the cam members (43). The actuation members include terminal portions (57) which extend to the exterior of the gear case and engage a cam surface (77;101) of an actuating cam member (71;91). The actuating cam member has an outer peripheral retarding surface (79) which may be engaged by a plunger (85;113) of an electromagnetic actuator (81;107) in response to the external signal (83). Engagement of the retarding surface (79) by the plunger causes ramping of the terminal portions (57) on the cam surface, and resulting axial movement of the actuation members (53), thus initiating ramping of the cam (41) and engagement of the clutch pack (35), with relatively little axial force involved, and utilizing a differential structure which is modified only slightly from those now commercially available.

16 Claims, 5 Drawing Sheets

LIMITED SLIP DIFFERENTIAL

BACKGROUND OF THE DISCLOSURE

The present invention relates to limited slip differentials, and more particularly, to such differentials of the type referred to as locking differentials, having means for retarding differentiating action, and actuating means for actuating the retarding means.

Limited slip and locking differentials of the type to which the present invention relates typically include a gear case defining a gear chamber and disposed therein, a differential gear set including at least one input pinion gear and a pair of output side gears. A clutch pack is typically disposed between one of the side gears and an adjacent surface of the gear case, such that the clutch pack is operable to retard, or even prevent, rotation between the gear case and the side gears. In a locking differential, disposed between the clutch pack and its adjacent side gear is a cam means, operable to engage the clutch pack upon relative rotation of the cam members.

In many limited slip and locking differentials, some sort of actuating mechanism is provided to actuate or move the clutch pack to its engaged condition. One of the current trends in the field of vehicle traction modifiers involves the desire to be able to actuate the clutch packs in response to an external signal, rather than in response to the sensing of a predetermined speed differential as has typically been the case in the prior art.

U.S. Pat. No. 4,583,424 illustrates a locking differential in which the clutch is actuated by an actuator of the piston-cylinder type. The device illustrated in U.S. Pat. No. 4,583,424 may be generally satisfactory from an operational standpoint, but the overall device is excessively complex, requiring fluid passages and expensive seal arrangements.

Another prior art device is shown in U.S. Pat. No. 3,133,454, which illustrates a locking differential in which the locking is accomplished electromagnetically, in response to an input electrical signal. This device is also excessively complex, requiring electromagnetic coils within the differential case, and a substantial increase in the total number of parts.

SUMMARY OF THE INVENTION

Accordingly, it is an object of the present invention to provide an improved limited slip or locking differential of the type in which the clutch pack may be actuated in response to an external signal, wherein the differential overcomes the problems associated with the prior art devices.

More specifically, it is an object of the present invention to provide an improved limited slip or locking differential in which the clutch actuating means is a cam means which is actuated by an actuating mechanism, part of which is disposed external to the differential case.

It is a related object of the present invention to provide an improved limited slip or locking differential which achieves the above-stated objects, and which is relatively simple in construction, and requires relatively little modification of the limited slip and locking differentials now commercially available.

The above and other objects of the present invention are accomplished by the provision of an improved differential gear mechanism of the type including a gear case defining an axis of rotation and a gear chamber. Differential gear means is disposed in the gear chamber and includes at least one input gear and first and second output gears. Included is means for retarding differentiating action of the differential gear means in response to an input signal, the retarding means including clutch means operable between an engaged condition, effective to retard relative rotation between the gear case and the output gears, and a disengaged condition. The retarding means further includes cam means operatively associated with the clutch means, and including first and second cam members, the second cam member being axially movable relative to the first cam member in response to relative rotation therebetween, away from a neutral position, to effect the engaged condition of the clutch means. An elongated actuation member is mounted for movement relative to the gear case and is operable to be in engagement with the second cam member.

The improved differential gear mechanism is characterized by the elongated actuation member being supported by the gear case at two axially spaced-apart locations disposed on axially opposite sides of the input gear, and including a terminal portion extending through the gear case to the exterior thereof. The elongated actuation member is axially movable relative to the gear case, and includes means biasing the actuation member toward a normally disengaged condition in which the first and second cam members remain in the neutral position. The differential mechanism further includes actuation means operable in response to an input signal to engage the actuation member and cause axial movement thereof, in opposition to the force of the biasing means. The elongated actuation member is operably engaged with the second cam member, such that axial movement of the actuation member results in axial movement of the second cam member, relative to the first cam member, away from the neutral position.

DESCRIPTION OF THE PREFERRED EMBODIMENTS

Figure 1:
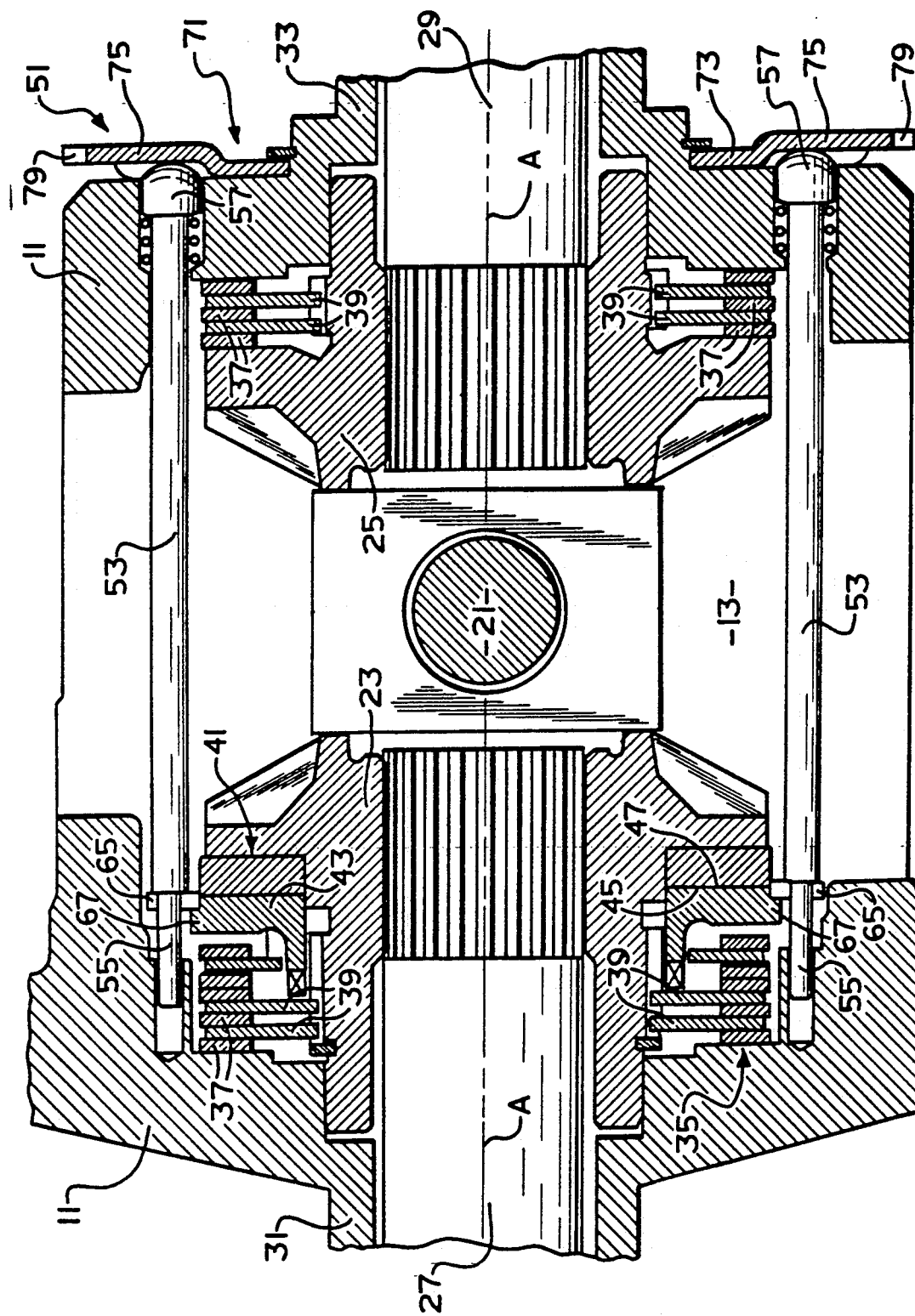
FIG. 1 is an axial cross-section of a limited slip differential of the locking type, illustrating the present invention.

Referring now to the drawings, which are not intended to limit the present invention, FIG. 1 is an axial cross-section of a locking differential gear mechanism of the type with which the present invention may be utilized. The construction and operation of the locking differential illustrated in FIG. 1 may be better understood by reference to U.S. Pat. No. 3,831,462, assigned to the assignee of the present invention and incorporated herein by reference.

The differential gear mechanism includes a gear case 11 which defines therein a gear chamber, generally designated 13. Torque input to the differential mechanism is typically by means of an input ring gear which may be attached to the gear case 11 by means of a plurality of bolts. Neither the ring gear nor the bolts form any part of the present invention, and therefore, are not shown in FIG. 1 but are clearly shown and described in above-incorporated U.S. Pat. No. 3,831,462.

Disposed within the gear chamber 13 is a differential gear set including a plurality of planet pinions (not shown in FIG. 1, but illustrated and described in above-incorporated U.S. Pat. No. 3,831,462), rotatably mounted on a pinion shaft 21, which is secured to the gear case 11 by any suitable means. The planet pinions comprise the input gears of the differential gear set, and are in meshing engagement with a pair of side gears 23 and 25, which comprise the output gears of the differential gear set. The side gears 23 and 25 are splined to a pair of axle shafts 27 and 29, respectively. The gear case 11 includes annular hub portions 31 and 33, on which may be mounted a pair of bearing sets (not shown herein) used to provide rotational support for the differential mechanism relative to an outer differential housing H (shown only in FIG. 3).

As is well known to those skilled in the art, during normal, straight-ahead operation of the vehicle, no differentiation occurs between the left and right axle shafts 27 and 29, and therefore, the pinions do not rotate relative to the pinion shaft 21. The gear case 11, the pinions, the side gears 23 and 25, and the axle shafts 27 and 29 all rotate about the axis of rotation of the shafts 27 and 29 as a solid unit.

Under certain operating conditions, such as when the vehicle is turning, or a slight difference in the tire size exists, it is permissible for a certain amount of differentiating action to occur between the side gears 23 and 25. Above a certain, predetermined differential between the speeds of the side gears 23 and 25, it is desirable to retard the relative rotation between the gear case 11 and the side gears 23 and 25, in order to prevent excessive differentiating action. There may also be operating conditions wherein it is desirable to lock up the differential mechanism, to prevent any differentiating action, even before it has a chance to occur.

In order to retard differentiating action, the differential gear mechanism is provided with a lock-up means for locking up the differential gear set, and an actuating means for actuating the lock-up means. The general construction and operation of the lock-up means is well known in the art and will be described only briefly herein. For a more detailed explanation of the lock-up means, reference should be made to above-incorporated U.S. Pat. No. 3,831,462.

In the subject embodiment, the lock-up means comprises a clutch pack, generally designated 35, including a plurality of clutch discs 37 splined to the gear case 11, and a plurality of clutch discs 39 splined to the side gear 23. The lock-up means further includes a cam mechanism, generally designated 41. As is well known to those skilled in the limited slip and locking differential arts, the primary function of the cam mechanism 41 is to effect movement of the clutch pack 35 from the disengaged condition shown in FIG. 1 to an engaged condition. In the engaged condition, the clutch pack 35 is effective to retard relative rotation between the gear case 11 and the side gears 23 and 25.

The cam mechanism 41 includes the side gear 23 and a main cam member 43. The side gear 23 defines a cam surface 45, and the cam member 43 defines a mating, rising and falling cam surface 47 of the type well known in the art. During normal, straight-ahead operation of the vehicle, with little or no differentiation occurring, the cam surfaces 45 and 47 remain in the neutral position shown in FIG. 1, and the cam member 43 rotates with the side gear 23, at the same rotational speed. Movement of the clutch pack 35 to the engaged condition may be accomplished by retarding rotation of the cam member 43, relative to the side gear 23, which causes "ramping" of the cam surfaces 45 and 47, resulting in axial movement of the cam member 43 to the left in FIG. 1.

In order to retard rotation of the cam member 43, relative to the side gear 23, the differential gear mechanism of the present invention includes an actuating mechanism, shown partially in FIG. 1 and generally designated 51. The actuating mechanism 51 includes a pair of substantially identical elongated actuation members 53, each of which has, at its left end in FIG. 1, a reduced diameter portion 55 received in a bore defined by the gear case 11. In addition, each of the actuation members 53 includes, toward its right end in FIG. 1, an enlarged, terminal portion 57 which extends through the gear case 11 to the exterior thereof. In the subject embodiment, there are two of the actuation members 53, each of which is circumferentially disposed about 90 degrees from each of the input pinion gears. However, those skilled in the art will understand that within the scope of the present invention, the number of the actuation members 53 may be less than two or greater than two, and the number thereof is not an essential feature of the present invention.

Figure 4:
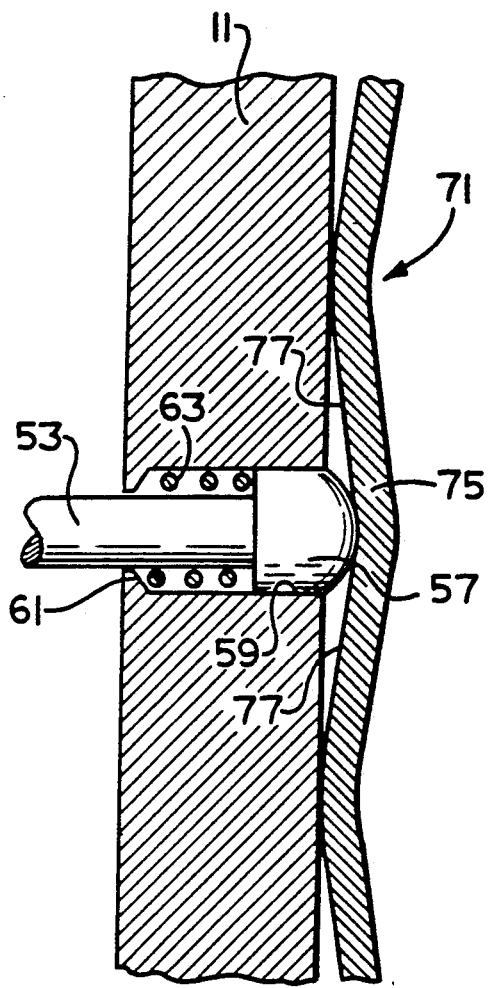
FIG. 4 is an axial cross-section, taken on line 4—4 of FIG. 2, and on a plane perpendicular to that of FIGS. 1 and 3, but on a larger scale, illustrating the engagement of the elongated actuation member and the actuation cam member.

Referring now to FIG. 4, in conjunction with FIG. 1, for each of the actuation members 53, the gear case 11 defines an enlarged bore 59 which receives the terminal portion 57 of the actuation member 53. At the left end of each of the enlarged bores 59, the gear case 11 defines a reduced diameter portion 61 which forms a seat for a helical compression spring 63, the function of which is to bias the actuation member 53 toward the right in FIGS. 1 and 4, for reasons which will be explained subsequently.

Referring again primarily to FIG. 1, each of the actuation members 53 has, disposed about its reduced diameter portion 55, a washer member 65. Each washer member 65 is seated in engagement with a shoulder portion 67, extending radially from the outer periphery of the cam member 43.

Figure 2:
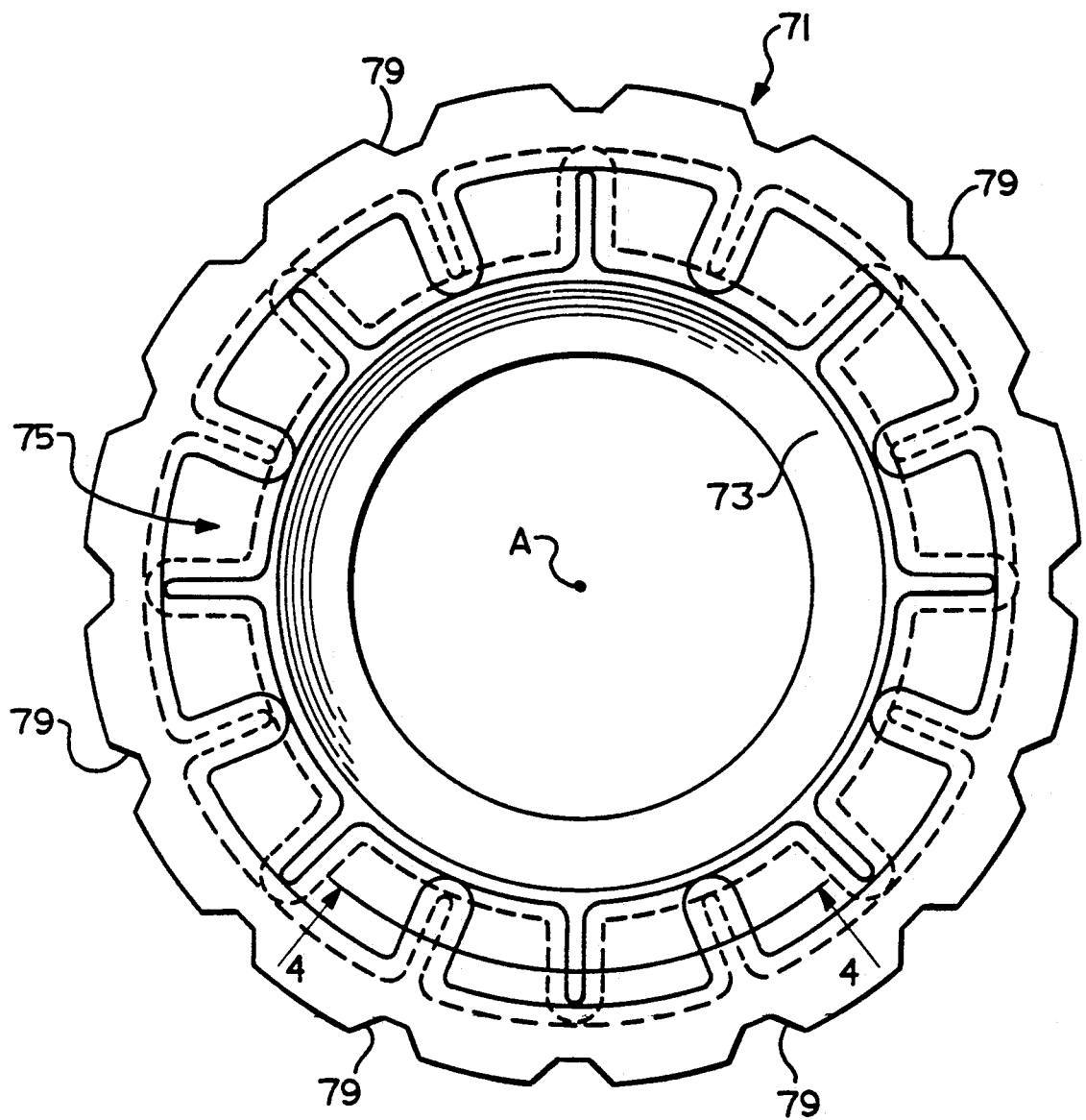
FIG. 2 is a plan view, viewed from the right end in FIG. 1, of the actuation cam member of the present invention.

Referring now to FIG. 2, in conjunction with FIG. 1, the actuating mechanism 51 further includes a plate-like, actuating cam member 71, including a radially inner portion 73, disposed about the hub portion 33. As may best be seen in FIG. 4, the actuating cam member 71 includes an undulating portion 75, disposed radially outwardly of the inner portion 73. The undulating portion 75 defines a rising and falling cam surface 77, with the terminal portion 57 of the actuation member 53 being biased into engagement with the cam surface 77. Rotation of the actuating cam member 71 about the axis of rotation A in either direction from the neutral position shown in FIG. 4 will result in movement of the actuation members 53 to the left in FIGS. 1 and 4, in opposition to the force of the biasing springs 63. The actuating cam member 71 includes an outer, peripheral retarding surface 79 which, in the preferred embodiment, comprises a plurality of peripheral notches, into which a retarding member may extend, engaging the retarding surface 79, and thus preventing rotation of the actuating cam member 71 with the gear case 11.

Figure 3:
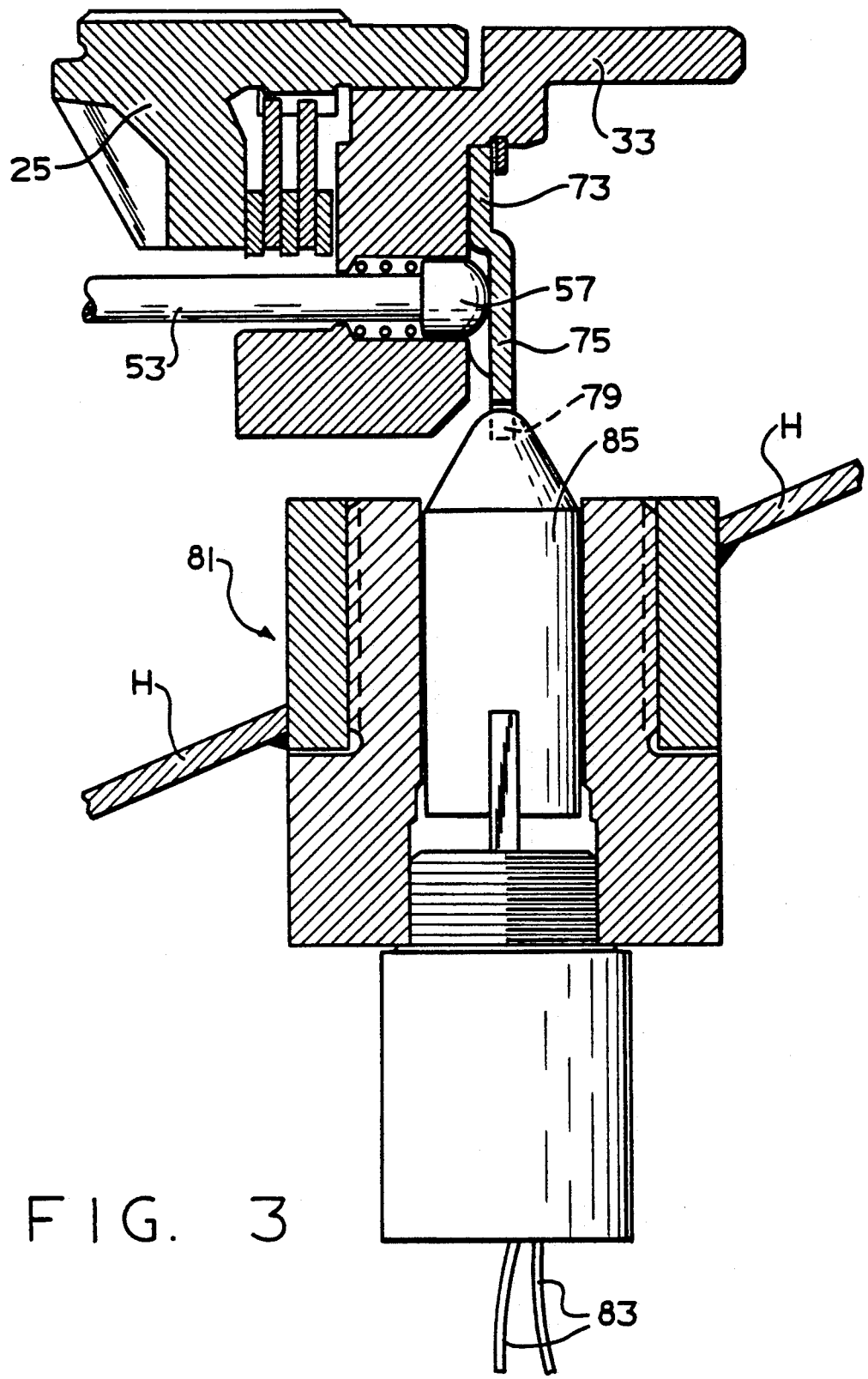
FIG. 3 is a fragmentary, axial cross-section, taken on the same plane as FIG. 1, but illustrating the electromagnetic actuator in engagement with the actuating cam member.

Referring now primarily to FIG. 3, there is illustrated an electromagnetic actuator, generally designated 81, which is illustrated in FIG. 3 as being welded to the stationary, outer differential housing H. It should be understood that the particular construction of the actuator 81 forms no part of the present invention, but instead, it is important merely that the differential mechanism include some form of retarding means, capable of retarding rotation of the actuating cam member 71, relative to the gear case 11, in response to an external signal. Referring still to FIG. 3, the actuator 81 receives an external electrical signal, represented by a pair of electrical leads 83, and further includes an armature member 85, which is movable radially in response to the presence of the electrical signal 83, to the position shown in FIG. 3 in which the armature member 85 is in engagement with the retarding surface 79.

In operation, whenever the armature member 85 engages any one of the notches comprising the retarding surface 79, rotation of the actuating cam member 71, relative to the differential housing H, is prevented, such that the gear case 11 is now rotating relative to the actuating cam member 71. The resulting relative movement between the elongated actuation members 53 and the actuating cam member 71 results in a ramping action of the terminal portions 57 on the cam surface 77, thus resulting in axial movement (to the left in FIGS. 1, 3 and 4) of the actuation members 53. Such leftward movement of the members 53 moves the cam member 43 slightly to the left in FIG. 1, thus initiating ramping of the cam surface 47 relative to the cam surface 45. As is well known to those skilled in the art, as this ramping action begins, the clutch pack 35 is beginning to engage, and such engagement results in a frictional drag being exerted on the cam member 43, thus causing further ramping and, in turn, further engagement of the clutch pack 35.

It should be noted that in the embodiment of FIGS. 1-4, the actuating cam member 71 comprises a simple, one-piece stamped member. When it is engaged by the actuator 81, and stops rotating relative to the outer differential housing H, it is necessary for the actuation members 53 to have enough axial travel to the left that the terminal portions 57 retract below the surface of the gear case 11, to permit the case 11 to rotate relative to the fixed actuating cam member 71.

EMBODIMENT OF FIGS. 5 AND 6

Figure 6:
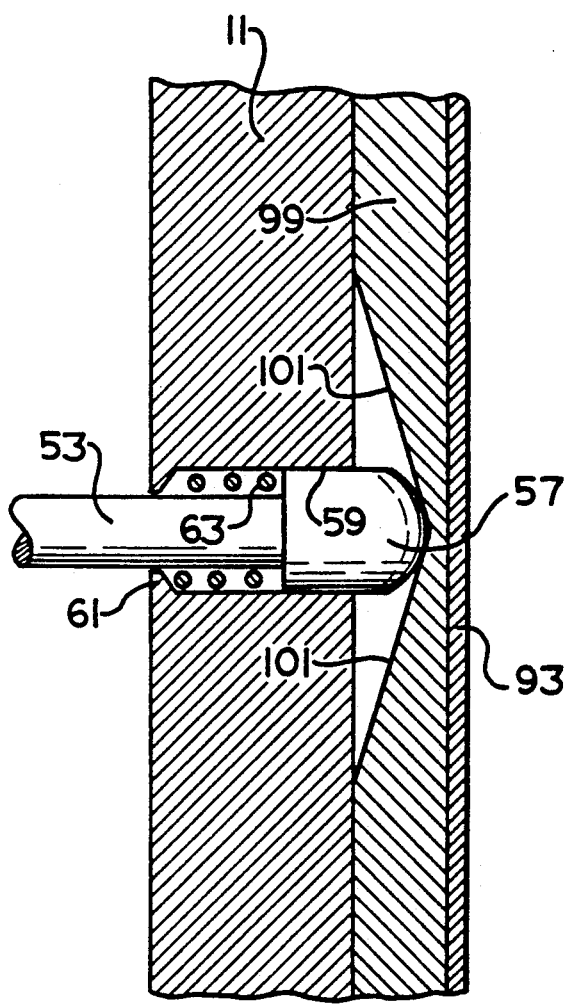
FIG. 6 is an axial cross-section, similar to FIG. 4, taken on line 6—6 of FIG. 5.
Figure 5:
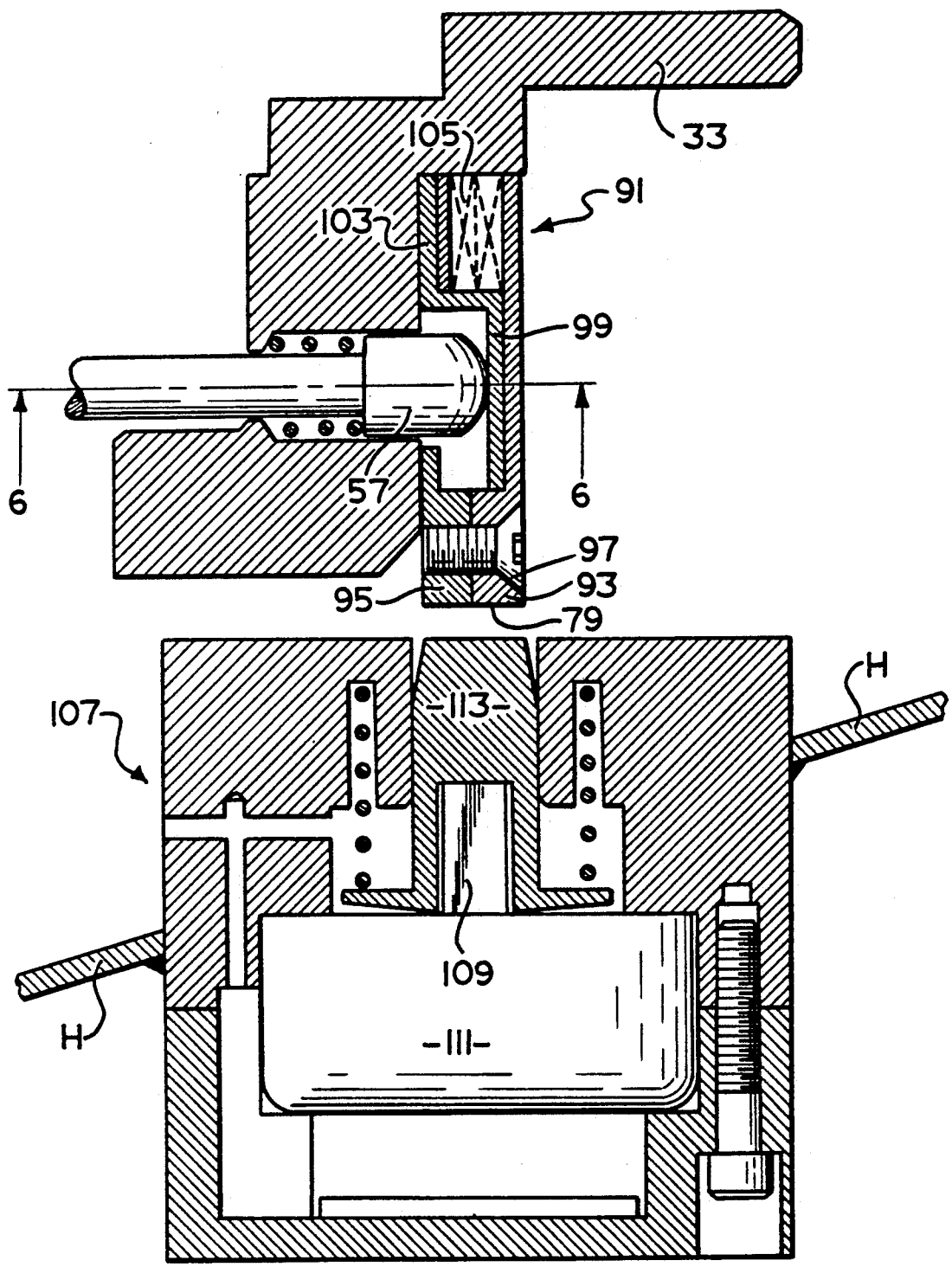
FIG. 5 is a fragmentary, axial cross-section, similar to FIG. 3, illustrating an alternative embodiment of the actuator and actuating cam member of the present invention.

In some situations, it may be considered undesirable to have the actuating cam member 71 rotate continuously, past the terminal portions 57. Therefore, in FIGS. 5 and 6 there is illustrated an alternative embodiment of the present invention which eliminates such relative movement. In the embodiment of FIGS. 5 and 6, elements which are the same as in the embodiment of FIGS. 1 through 4 bear the same reference numeral, and elements which are substantially modified bear reference numerals in excess of 90.

The embodiment of FIG. 5 includes an actuating cam assembly, generally designated 91, including a pair of housing members 93 and 95, fixed relative to each other by means of a plurality of threaded fasteners 97. Disposed within the housing members 93 and 95 is an actuating cam member 99 which defines a rise and fall cam surface 101, disposed adjacent each of the terminal portions 57. The member 99 includes a radially inner portion 103 (shown only in FIG. 5), disposed adjacent a gear case 11, and disposed between the radially inner portion 103 and the housing member 93 is a wave spring arrangement 105, one of the functions of which is to maintain the portion 103 in the position shown in FIG. 5.

Referring still primarily to FIG. 5, disposed adjacent the assembly 91 is an electromagnetic actuator 107, including an inner plunger 109 which is directly actuated by an electromagnetic coil 111. The plunger 109 in turn actuates an outer plunger 113, disposed to radially inwardly and engage the retarding surface defined by the housing members 93 and 95. The retarding surface may be configured in a manner similar to the retarding surface 79 of the embodiment of FIGS. 1-4. When the actuator 107 receives an electrical input signal, and the plunger 113 engages the retarding surface of the cam assembly 91, rotation thereof relative to the outer housing H is prevented, and the gear case 11 now rotates relative to the cam assembly 91. The biasing force of the wave spring arrangement 105 is selected to be sufficient to retard rotation of the actuating cam member 99 relative to the housing members 93 and 95, thereby initiating ramping action of the terminal portions 57 on the cam surface 101.

One difference noticeable in the embodiment of FIGS. 5 and 6 is that the terminal portions 57 extend further axially out of the gear case 11 such that, after movement to the left of the actuation members 53 to initiate engagement of the clutch packs 35, the terminal portions 57 still are in engagement with the cam surface 101. Thus, the actuating cam member 99 then rotates relative to the housing member 93, at the same speed as the gear case 11, thus maintaining the actuation members 53 in their leftward actuating position.

It should be seen that the present invention provides an improved differential gear mechanism of the type in which the clutch pack may be actuated in response to an external signal, but which is of relatively simple and inexpensive construction. Furthermore, because actuation of the clutch pack 35 is initiated by axial movement of the actuation members 53, and of the cam member 43, only a relatively small amount of axial force is required. It has been found that only about 20 pounds of axial force is required on the actuation members 53, in order to initiate engagement of the clutch pack 35. By way of contrast, in order to engage the clutch pack 35 by means of a direct application of force, in the axial direction, would typically require approximately 1,000 pounds of force.

An additional benefit of the present invention is the substantial elimination of any tendency for the mechanism to undergo "self-engagements" of the type which have been known to occur in devices of the type shown in above-incorporated U.S. Pat. No. 3,831,462.

The invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A differential gear mechanism of the type including a gear case defining an axis of rotation and a gear chamber; differential gear means disposed in said gear chamber including at least one input gear and first and second output gears; means for limiting differentiating action of said differential gear means in response to an input signal, said limiting means including clutch means operable between an engaged condition, effective to retard relative rotation between said gear case and said output gears, and a disengaged condition; said limiting means further including cam means operatively associated with said clutch means, and including first and second cam members, said second cam member being axially movable relative to said first cam member in response to relative rotation therebetween away from a neutral position, to effect said engaged condition of said clutch means; and an elongated actuation member being mounted for movement relative to said gear case and operable to be in engagement with said second cam member; characterized by:
   (a) said elongated actuation member being supported by said gear case at two axially spaced-apart locations disposed on axially opposite sides of said input gear, and including a terminal portion extending through said gear case to the exterior thereof;
   (b) said elongated actuation member being axially movable relative to said gear case, and including means biasing said actuation member toward a normally disengaged condition in which said first and second cam members remain in said neutral position;
   (c) said actuation means further including means operable in response to said input signal to engage said actuation member and cause axial movement thereof, in opposition to the force of said biasing means; and
   (d) said elongated actuation member being operably engaged with said second cam member, such that axial movement of said actuation member results in axial movement of said second cam member, relative to said first cam member, away from said neutral position.

2. A differential gear mechanism as claimed in claim 1 characterized by said axial movement of said second cam member, relative to said first cam member, results in engagement of said second cam member and said clutch means, retarding rotation of said second cam member, relative to said first cam member.

3. A differential gear mechanism as claimed in claim 1 characterized by said clutch means comprising a plurality of clutch members disposed axially between said first output gear and said gear case, said second cam member being disposed axially between said first cam member and said clutch means.

4. A differential gear mechanism as claimed in claim 1 characterized by said mechanism including a pair of said elongated actuation members, each of said actuation members being supported by said gear case at two axially spaced-apart locations disposed on axially opposite sides of said input gear, and including a terminal portion extending through said gear case to the exterior thereof.

5. A differential gear mechanism as claimed in claim 1 characterized by said mechanism including a pair of said elongated actuation members, each of said actuation members being axially movable relative to said gear case, and including means biasing said actuation member toward said normally disengaged condition in which said first and second cam members remain in said neutral position.

6. A differential gear mechanism as claimed in claim 1 characterized by said actuation means comprising a rotatable actuating cam member disposed on the exterior of said gear case and normally being rotatable therewith, said actuating cam member including a cam surface in engagement with said terminal portion of said actuation member.

7. A differential gear mechanism as claimed in claim 6 characterized by said cam surface of said actuating cam member being configured such that rotation of said actuating cam member, relative to said gear case causes said axial movement of said elongated actuation member.

8. A differential gear mechanism as claimed in claim 7 characterized by said actuation means further comprising retarding means operable, in response to said input signal, to retard rotation of said actuating cam member, relative to said gear case.

9. A differential gear mechanism as claimed in claim 8 characterized by said retarding means comprising an electromagnetic means, said actuating cam member including an outer, peripheral retarding surface, said electromagnetic means including a movable plunger member movable, in response to said input signal, into engagement with said retarding surface, to retard rotation of said actuating cam member relative to said gear case.

10. A differential gear mechanism of the type including a gear case defining an axis of rotation and a gear chamber; differential gear means disposed in said gear chamber including at least one input gear and first and second output gears; means for limiting differentiating action of said differential gear means in response to an input signal, said limiting means including clutch means operable between an engaged condition, effective to retard relative rotation between said gear case and said output gears, and a disengaged condition; said limiting means further including cam means operatively associated with said clutch means, and including first and second cam members, said second cam member being axially movable relative to said first cam member in response to relative rotation therebetween away from a neutral position, to effect said engaged condition of said clutch means; and an elongated actuation member being mounted for movement relative to said gear case and operable to be in engagement with said second cam member; characterized by:
   (a) a pair of said elongated actuation members being supported by said gear case, and disposed approximately diametrically about said axis of rotation, each of said elongated actuation members including a terminal portion extending through said gear case to the exterior thereof;
   (b) each of said elongated actuation members being axially movable relative to said gear case, and each including means biasing said actuation member toward a normally disengaged condition in which said first and second cam members remain in said neutral position;
   (c) said actuation means further including means operable in response to said input signal to engage said actuation members and cause axial movement thereof, in opposition to the force of said biasing means; and (d) each of said elongated actuation members being in engagement with said second cam member, such that axial movement of said actuation members results in axial movement of said second cam member, relative to said first cam member, away from said neutral position.

11. A differential gear mechanism as claimed in claim 10 characterized by said axial movement of said second cam member, relative to said first cam member, results in engagement of said second cam member and said clutch means, retarding rotation of said second cam member, relative to said first cam member.

12. A differential gear mechanism as claimed in claim 10 characterized by said clutch means comprising a plurality of clutch members disposed axially between said first output gear and said gear case, said second cam member being disposed axially between said first cam member and said clutch means.

13. A differential gear mechanism as claimed in claim 10 characterized by said actuation means comprising a rotatable actuating cam member disposed on the exterior of said gear case and normally being rotatable therewith, said actuating cam member including a cam surface in engagement with said terminal portion of said actuation members.

14. A differential gear mechanism as claimed in claim 13 characterized by said cam surface of said actuating cam member being configured such that rotation of said actuating cam member, relative to said gear case causes said axial movement of said elongated actuation members.

15. A differential gear mechanism as claimed in claim 14 characterized by said actuation means further comprising retarding means operable, in response to said input signal, to retard rotation of said actuating cam member, relative to said gear case.

16. A differential gear mechanism as claimed in claim 15 characterized by said retarding means comprising an electromagnetic means, said actuating cam member including an outer, peripheral retarding surface, said electromagnetic means including a movable plunger member movable, in response to said input signal, into engagement with said retarding surface, to retard rotation of said actuating cam member relative to said gear case.

* * * * *